United States Patent [19]

Minichev et al.

[11] 4,074,161

[45] Feb. 14, 1978

[54] POLE ASSEMBLY OF A DYNAMOELECTRIC MACHINE

[76] Inventors: Vasily Mikhailovich Minichev, Kubinskaya ulitsa, 64, kv. 8; Evgeny Moiseevich Simis, 7 Sovetskaya ulitsa, 15/19, kv. 1; Vladimir Konstantinovich Judin, Kuznetsovskaya ulitsa, 10, korpus 3, kv. 55, all of Leningrad, U.S.S.R.

[21] Appl. No.: 668,187

[22] Filed: Mar. 18, 1976

[51] Int. Cl.² ............................................. H02K 3/46
[52] U.S. Cl. .................................... 310/194; 310/214
[58] Field of Search ................. 310/194, 269, 42, 214, 310/215, 217, 218; 336/197

[56] References Cited

U.S. PATENT DOCUMENTS 1,506,763  9/1924  Mattman ............................. 310/194
2,258,228  10/1941  Stimson ............................. 336/197
3,339,097  8/1967  Dunn ................................. 310/194

FOREIGN PATENT DOCUMENTS 49,767  5/1920  Sweden .............................. 310/194
300,655  5/1968  Sweden .............................. 310/194

*Primary Examiner*—R. Skudy
*Attorney, Agent, or Firm*—Lackenbach, Lilling & Siegel

[57] ABSTRACT

A pole assembly for a dynamoelectric machine comprising an induction coil received about a core, abutment strips connected to the core and arranged adjacent to at least one bearing surface of the induction coil, tightening bolts with internal sockets for tightening the same, which are screwed into threaded openings, there being at least one such threaded opening in each one of the strips, the bolts abutting against the bearing surface of the induction coil.

5 Claims, 3 Drawing Figures

POLE ASSEMBLY OF A DYNAMOELECTRIC MACHINE

The present invention relates to electrical engineering, and more particularly it relates to the structures of the pole assemblies of dynamoelectric machines.

The invention can be used in dynamoelectric machines with relatively high power ratings.

At present, the development of the industry making highpower dynamoelectric machines displays a noticeable tendency of stepping up the power rations of electric machines and, consequently, their dimensions and weight, as well as the dimensions and weight of individual assemblies of such electric machines, including poles, their cores and induction coils.

Thus, the requirements concerning the reliability of securing an induction coil on a core become ever increasingly strict, the requirements now demand that there should be ensured zones of guaranteed tightening efforts at a plurality of points about the perimeter of the pole.

Furthermore, to increase the strength of the electric insulation of a machine, there is at present a widely employed practice of impregnating the electric insulation of individual assemblies, pole assemblies included, with thermoreactive compositions. Therefore, this has necessitated the assembling of pole units independently prior to their being mounted in a machine, so that the electric insulation of the pole assembly can be impregnated and subsequently dried.

Known in the art is a pole assembly of a dynamoelectric machine which comprises a core and an induction coil or winding received about this core, insulating washers and adjustment gaskets. The induction coil is secured by the pole being tightened against the yoke of the framework with polesupported bolts screwed into the core when the magnetic system of the machine is being assembled.

However, this design does not allow independent assembling of the poles. Therefore, there is required a whole array of production equipment for compressing, assembling, impregnating and handling the pole assemblies.

Besides, with the induction coil being secured on the core by being tightened against the yoke of the framework with the pole-supported bolts, the required tightening of the induction coil against the core is not provided. Furthermore, the operation of assembling a pole unit of this design is labor-consuming, involving as it does adjusting in situ the thickness of the insulation washers and adjustment strips to compensate for tolerances in the manufacture of the induction coil.

There is also known in the prior art a pole assembly of a dynamoelectric machine comprising a core with inserts received in its slots, an induction coil received on the core and strips. The induction coil is secured on the core by the strips being welded to the inserts.

However, the necessity of performing the welding operation on the pole assembly brings in the hazard of splashes of the metal being welded finding their way into the cavities of the pole assembly, with a resulting deficiency of the strength of the electric insulation of the pole and of the electric machine as a whole. Besides, the last-mentioned design requires the use of compressing devices in the course of the operation of welding the strips to the inserts to ensure the tightness of the induction coil against the strips. Moreover, this tightness might become slack when the compressing effort is relieved, on account of the tolerances of the respective sizes of the slots and the inserts therein, such tolerances being essential for assembling the inserts in the slots.

There is also known a pole assembly of a dynamoelectric machine comprising a magnet core with an induction coil received thereabout, which is pressed by strips inserted into the slots of the magnet core.

However, this design cannot provide for tightly securing the induction coil on the magnet core, since the strips can be inserted into the slots only when there is some degree of play of the strips relative to the coil. Should the strips used be of an elastic character, the effort created between the strips and the coil would be insufficient for machines of a great size and high power ratings.

Besides, this design requires performance of a fitting operation when the pole is being assembled to ensure that the strips are inserted in the slots.

It is an object of the present invention to increase the reliability of securing an induction coil on a core by ensuring the required tightening effort about the perimeter of the pole assembly.

It is another object of the present invention to improve the dependability of the performance of the pole assembly, owing to the elimination of welding operations in the course of assembling the pole.

It is still another object of the present invention to increase the productivity of labor during pole assembling operations, owing to the elimination of the fitting operations and of the necessity of using auxiliary devices.

These and other objects are accomplished by a design of a pole assembly of a dynamoelectric machine, including an induction coil received about a core and abutment strips connected to the core and arranged adjacent to at least one bearing surface of the induction coil, in which design, in accordance with the present invention, there are also included tightening bolts having internal sockets for tightening the same, the bolts being threadedly received in threaded openings of which at least one is made in each said abutment strip, the bolts abutting against the bearing surface of the induction coil.

The present invention offers reliable securing of the induction coil on the core, while ensuring the required tightening effort about the perimeter of the pole.

Furthermore, the present invention increases the reliability of the performance of the pole assembly owing to the welding operations having been eliminated in the course of its assembling.

Moreover, the present invention reduces the amount of labor consumed during the manufacture of the pole assembly, owing to the fitting operations in the course of its assembling having been eliminated.

In addition, the present invention has reduced the production cost of a pole assembly, because it has eliminated the necessity of using specific devices for compressing, impregnating and handling the pole assemblies.

Other objects and advantages of the present inventions will be apparent from the following description of an embodiment thereof, with reference being had to the accompanying drawings, wherein.

The present invention will be described hereinbelow in connection with its embodiment in a direct-current dynamoelectric machine.

Figure 1:
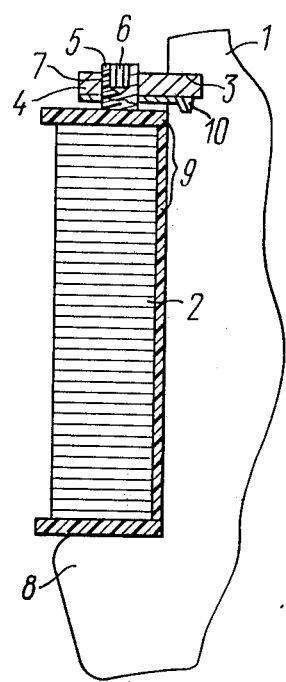
FIG. 1 is a partial cross-sectional view, partially broken away, illustrating a pole assembly of a dynamoelectric machine, according to the invention.

The pole assembly (FIG. 1) includes a core 1 and an induction coil or winding 2 received about the core 1. The latter has slots 3 made therein, in which abutment strips 4 are received. The induction coil 2 is secured on the core 1 with the aid of tightening bolts 5 each of which has an internal socket 6 for a socket wrench, by which tightening of the bolts 6 is made possible. The tightening bolts 5 are threadedly received in the respective threaded openings 7 made in the abutment strips 4, so that the bolts 5 have their ends abutting against the adjacent bearing surface of the induction coil 2. The other bearing surface of the induction coil 2 abuts against a shoulder 8 provided on the core 1. The induction coil 2 is insulated from the coil 1 and from the ends of the tightening bolts 5 by insulating gaskets 9. The abutment strips 4 are retained in the respective slots 3 with lock washers 10, which have openings made therethrough through which the respective bolts 5 extend. To prevent self-inflicted loosening of the bolts 5 during operation of the dynamoelectric machine, following their final tightening the thread thereof is offset, e.g. by swaging. To compensate for the certain yield of the abutment strips 4 and of the core 1, the slots 3 are somewhat inclined with respect to the horizontal axis of the core 1.

Figure 2:
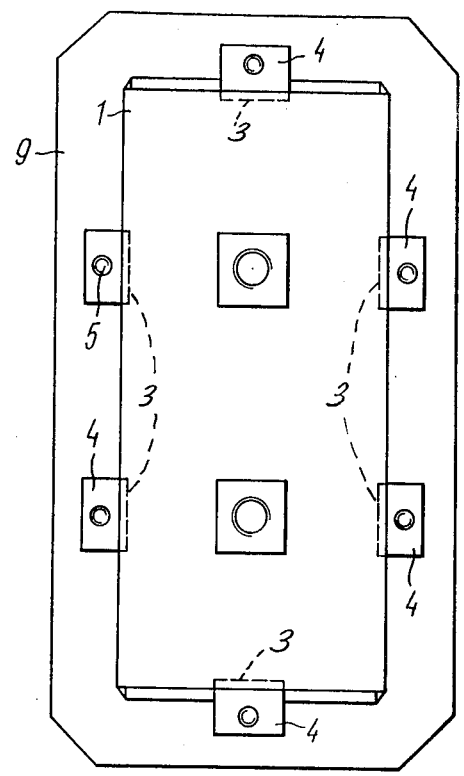
FIG. 2 is a plan view showing the pole assembly of a dynamoelectric machine, in accordance with the invention, viewed from the framework.

The layout of the slots 3 (FIG. 1) receiving the abutment strips 4 in the presently described embodiment is illustrated in FIG. 2.

Figure 3:
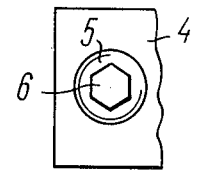
FIG. 3 is a view of a tightening bolt threaded into the abutment strip, according to the invention.

FIG. 3 of the appended drawings illustrates in greater detail the internal socket 6 (FIG. 1) made in each tightening screw 5, the socket in the presently described embodiment being hexagonal to accommodate a standard socket wrench.

A structure of a pole assembly in accordance with the present invention is usable both with laminated and solid cores of dynamoelectric machines.

The present invention is able to offer an increased reliability of performance of a dynamoelectric machine, a stepped up productivity of labor during manufacture of the pole assemblies and a reduced production cost of such pole assemblies.

What is claimed is:

1. A pole assembly of a dynamoelectric machine, comprising:

a core having slots and a shoulder;

an induction coil received about said core, the coil having a first and a second bearing surface, the second bearing surface abutting against said shoulder of said core;

abutment strips inserted in said slots, said strips having threaded openings;

lock washers retaining said abutment strips in the respective slots; and tightening bolts threadedly received in said threaded openings, said bolts having their ends abutting against said first bearing surface of said coil.

2. A pole assembly of a dynamoelectric machine according to claim 1, further comprising: insulation gaskets positioned to insulate said induction coil from said core and from said tightening bolts.

3. A pole assembly of a dynamoelectric machine according to claim 1, wherein said tightening bolts have sockets made in their ends which do not abut against said first bearing surface of said coil, for accommodating a socket wrench.

4. A pole assembly of a dynamoelectric machine according to claim 1, wherein said slots are inclined with respect to a horizontal axis of said core.

5. A pole assembly of a dynamoelectric machine according to claim 1, wherein the threads of the tightening bolts are offset by swaging.

* * * * *